US012217302B2

(12) United States Patent
Hudda et al.

(10) Patent No.: US 12,217,302 B2
(45) Date of Patent: Feb. 4, 2025

(54) INTERACTIVE PRODUCT REVIEW INTERFACE

(71) Applicant: eBay Inc., San Jose, CA (US)

(72) Inventors: Syeda Hudda, San Ramon, CA (US); Ethan O'Brien, Los Gatos, CA (US); Supraja Yadati, Cupertino, CA (US); Pramod Mahadev Mamidipudi, Sunnyvale, CA (US)

(73) Assignee: EBAY INC., San Jose, CA (US)

( * ) Notice: Subject to any disclaimer, the term of this patent is extended or adjusted under 35 U.S.C. 154(b) by 375 days.

(21) Appl. No.: 17/316,910

(22) Filed: May 11, 2021

(65) Prior Publication Data
US 2021/0264507 A1 Aug. 26, 2021

Related U.S. Application Data

(63) Continuation of application No. 14/986,091, filed on Dec. 31, 2015, now Pat. No. 11,030,677.
(Continued)

(51) Int. Cl.
*G06Q 30/0601* (2023.01)
*G06Q 30/0282* (2023.01)
*H04L 67/306* (2022.01)

(52) U.S. Cl.
CPC ..... *G06Q 30/0641* (2013.01); *G06Q 30/0282* (2013.01); *H04L 67/306* (2013.01)

(58) Field of Classification Search
CPC ............ G06Q 30/0641; G06Q 30/0282; H04L 67/306
(Continued)

(56) References Cited

U.S. PATENT DOCUMENTS

| 5,537,618 A | 7/1996 | Boulton et al. |
| 7,996,252 B2 | 8/2011 | Shahrabi et al. |

(Continued)

FOREIGN PATENT DOCUMENTS

| CN | 101183455 A | 5/2008 |
| CN | 101334787 A | 12/2008 |

(Continued)

OTHER PUBLICATIONS

Lin, Zhijie, "An empirical investigation of user and system recommendations in e-commerce," Decision Support Systems, 2014 (Year: 2014).*

(Continued)

*Primary Examiner* — Marissa Thein
*Assistant Examiner* — Thomas Joseph Sullivan
(74) *Attorney, Agent, or Firm* — SCHWEGMAN LUNDBERG & WOESSNER, P.A.

(57) ABSTRACT

Systems and methods for creating and presenting interactive product review interfaces are presented. The system processes a purchase request for a product from a user. The system then identifies one or more user feedback questions for the product. For each particular user feedback question, the system generates user feedback graphics based on stored user feedback associated with the particular user feedback question. The system transmits the one or more selected user feedback questions and the generated user feedback graphics to a client system associated with the user for display. The system receives user feedback for a user feedback question in the selected one or more user feedback questions. The system updates the user feedback graphic associated with the question to include the received user feedback. The system transmits the updated user feedback graphic to the client system for display in real-time.

20 Claims, 14 Drawing Sheets

Related U.S. Application Data

(60) Provisional application No. 62/203,837, filed on Aug. 11, 2015.

(58) Field of Classification Search
USPC ........................................................ 705/27.2
See application file for complete search history.

(56) References Cited

U.S. PATENT DOCUMENTS

| | | | |
|---|---|---|---|
| 8,122,371 B1* | 2/2012 | Keller | G06Q 30/02 |
| | | | 715/764 |
| 8,195,749 B2 | 6/2012 | Rao | |
| 8,600,796 B1* | 12/2013 | Sterne | G06Q 30/0203 |
| | | | 705/7.29 |
| 8,762,865 B2 | 6/2014 | Sunvold et al. | |
| 8,959,456 B2 | 2/2015 | Tateno | |
| 11,030,677 B2 | 6/2021 | Hudda et al. | |
| 2001/0037206 A1 | 11/2001 | Falk et al. | |
| 2002/0078152 A1 | 6/2002 | Boone | |
| 2006/0282304 A1* | 12/2006 | Bedard | G06Q 30/02 |
| | | | 705/7.29 |
| 2007/0112637 A1 | 5/2007 | So | |
| 2008/0059308 A1* | 3/2008 | Gerken | G06Q 30/02 |
| | | | 705/14.44 |
| 2008/0235375 A1* | 9/2008 | Reynolds | G06Q 30/02 |
| | | | 709/225 |
| 2010/0042422 A1* | 2/2010 | Summers | G06Q 10/00 |
| | | | 705/317 |
| 2010/0042468 A1 | 2/2010 | Doan et al. | |
| 2011/0251871 A1 | 10/2011 | Wilson Rogers et al. | |
| 2012/0123823 A1* | 5/2012 | Finkelstein | G06Q 30/0203 |
| | | | 705/7.32 |
| 2012/0124065 A1 | 5/2012 | Butterfield et al. | |
| 2012/0245923 A1* | 9/2012 | Brun | G06F 40/242 |
| | | | 704/E11.001 |
| 2013/0111323 A1* | 5/2013 | Taghaddos | G06F 40/174 |
| | | | 715/223 |
| 2013/0320086 A1 | 12/2013 | Kruglick | |
| 2014/0195370 A1 | 7/2014 | Devasia et al. | |
| 2014/0279232 A1 | 9/2014 | Lau et al. | |
| 2014/0351016 A1 | 11/2014 | Khundmiri | |
| 2014/0358731 A1 | 12/2014 | Itte et al. | |
| 2014/0365331 A1 | 12/2014 | Hafeez | |
| 2015/0040052 A1 | 2/2015 | Noel et al. | |
| 2015/0100457 A1 | 4/2015 | Scipioni | |
| 2015/0142520 A1* | 5/2015 | Bala | G06Q 30/0203 |
| | | | 705/7.32 |
| 2015/0220949 A1 | 8/2015 | Pinsley et al. | |
| 2015/0302012 A1* | 10/2015 | Bhagat | G06F 16/9558 |
| | | | 707/734 |
| 2017/0046775 A1 | 2/2017 | Tudda et al. | |

FOREIGN PATENT DOCUMENTS

| | | |
|---|---|---|
| CN | 101383032 | 3/2009 |
| CN | 101887557 | 11/2010 |
| CN | 102970337 A | 3/2013 |
| JP | 2013-088832 A | 5/2013 |
| KR | 2002-0027000 A | 4/2002 |
| KR | 10-2002-0072939 A | 9/2002 |
| KR | 10-2006-0099377 A | 9/2006 |
| KR | 10-2011-0024902 A | 3/2011 |
| WO | 2017/027696 A1 | 2/2017 |

OTHER PUBLICATIONS

Schafer, J. Ben, et al., "Recommender Systems in E-Commerce," Nov. 1999, EC '99: Proceedings of the 1st ACM conference on Electronic commerce (Year: 1999).*
Final Office Action Received for Korean Patent Application No. 10-2018-7006936, mailed on Nov. 27, 2019, 8 pages (3 pages of English Translation and 5 pages of Official copy).
Office Action received for Korean Patent Application No. 10-2018-7006936, mailed on Apr. 30, 2019, 10 pages (6 pages of Official copy and 4 pages of English Translation).
Final Office Action Received for Korean Patent Application No. 10-2020-7002639, mailed on Oct. 28, 2020, 6 Pages (3 pages of English Translation and 3 pages of Official Copy).
Office Action Received for Korean Patent Application No. 10-2020-7002639, mailed on Apr. 22, 2020, 11 pages (6 pages of Official Copy and 5 pages of English Translation).
International Preliminary Report on Patentability received for PCT Application No. PCT/US2016/046528, mailed on Feb. 22, 2018, 6 pages.
International Search Report received for International Application No. PCT/US2016/046528, mailed on Oct. 26, 2016, 2 pages.
Written Opinion received for PCT Patent Application No. PCT/US2016/046528, mailed on Oct. 26, 2016, 4 pages.
Dellarocas, C., "The Digitization of Word-of-Mouth: Promise and challenges of Online Reputation Mechanisms", Sloan School of Management, MIT, 2003, 1-35.
Almaliki et al., "The design of adaptive acquisition of users feedback: An empirical study", IEEE Eighth International Conference on Research Challenges in Information Science (RCIS). IEEE, 2014. (Year: 2014), 2014, 12 pages.
Office Action received for Chinese Patent Application No. 201680046800.4 mailed on Jan. 13, 2021, 10 Pages (with English translation).
Office Action Received for Chinese Patent Application No. 201680046800.4, mailed on May 28, 2020, 14 pages (With English translation).
"Chinese Application Serial No. 201680046800.4, Office Action mailed Mar. 8, 2022", With English translation, 14 pgs.
"Chinese Application Serial No. 201680046800.4, Response Filed May 23, 2022 to Office Action mailed Mar. 8, 2022", W English Claims, 12 pgs.
Notice of Allowance received for Korean Patent Application No. 10-2020-7002639, mailed on Feb. 2, 2021, 3 Pages(2 pages of official Copy only & 1 Page of English Translation).
Advisory Action Received for U.S. Appl. No. 14/986,091, mailed on Aug. 10, 2020, 3 pages.
Corrected Notice of Allowability received for U.S. Appl. No. 14/986,091, mailed on Feb. 24, 2021, 2 Pages.
Final Office Action received for U.S. Appl. No. 14/986,091, mailed on May 1, 2019, 25 pages.
Final Office Action Received for U.S. Appl. No. 14/986,091, mailed on May 4, 2020, 30 Pages.
Non-Final Office Action Received for U.S. Appl. No. 14/986,091, mailed on Oct. 2, 2020, 20 Pages.
Non-Final Office Action received for U.S. Appl. No. 14/986,091, mailed on Oct. 2, 2018, 28 pages.
Non-Final Office Action Received for U.S. Appl. No. 14/986,091, mailed on Aug. 29, 2019, 32 Pages.
Notice of Allowance Received for U.S. Appl. No. 14/986,091, mailed on Feb. 4, 2021, 15 Pages.
Decision of Rejection Received for Chinese Patent Application No. 201680046800.4, mailed on Jun. 3, 2021, 8 Pages (4 Official Copy Only & 4 Pages of English Translation).
"Chinese Application Serial No. 201680046800.4, Office Action mailed Jul. 19, 2022", With English translation, 12 pgs.
"Chinese Application Serial No. 201680046800.4, Decision of Rejection mailed Jan. 20, 2023", With English machine translation, 13 pgs.
U.S. Appl. No. 14/986,091, filed Dec. 31, 2015, Patened.

* cited by examiner

INTERACTIVE PRODUCT REVIEW INTERFACE

CLAIM OF PRIORITY

This application is a Continuation of U.S. application Ser. No. 14/986,091, filed Dec. 31, 2015, which claims priority to U.S. Provisional Application Ser. No. 62/203,837, filed Aug. 11, 2015, each of which is hereby incorporated by reference in its entirety.

TECHNICAL FIELD

Embodiments of the present disclosure relate generally to user interfaces and, more particularly, but not by way of limitation, to interactive product review interfaces.

BACKGROUND

The rise in electronic and digital device technology has rapidly changed the way society interacts with media and consumes goods and services. Digital technology enables a variety of consumer devices to be available that are very flexible and relatively cheap. Specifically, modern electronic devices, such as smartphones and tablets, allow a user to have access to a variety of useful applications even when away from a traditional computer. One useful application is the selling and buying of products and services through e-commerce computer networks.

Network-based commerce systems or other parties interested in selling products over computer networks, collect information about user experiences with products based on user-provided feedback. The greater the number of users who provide user feedback, the more useful the collected information will be to other users and to the network-based commerce system itself.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
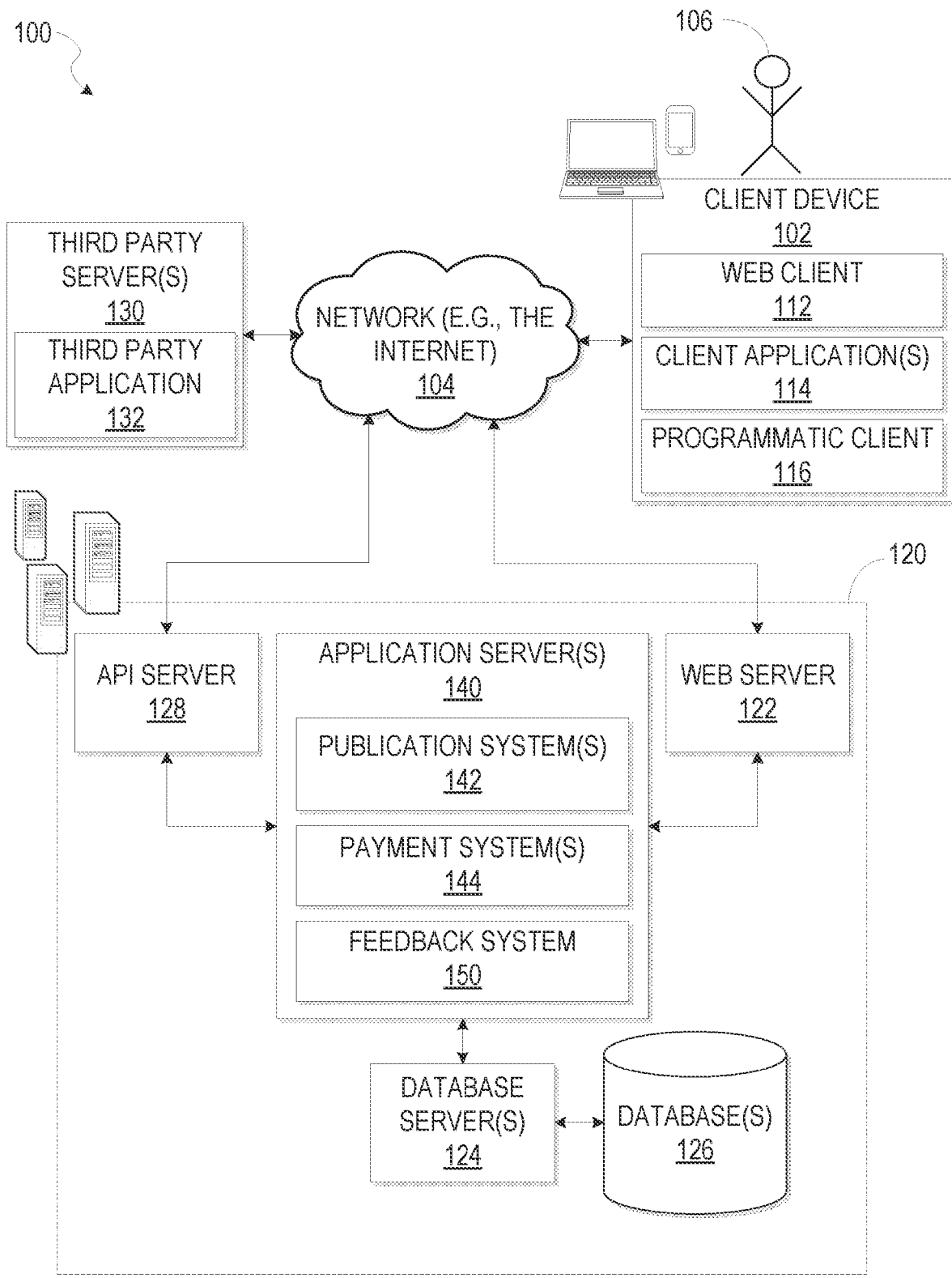
FIG. 1 is a block diagram illustrating a networked system, according to some example embodiments.

The description that follows includes systems, methods, techniques, instruction sequences, and computing machine program products that embody illustrative example embodiments of the disclosed subject matter. In the following description, for the purposes of explanation, numerous specific details are set forth in order to provide an understanding of various example embodiments of the disclosed subject matter. It will be evident, however, to those skilled in the art, that embodiments of the inventive subject matter may be practiced without these specific details. In general, well-known instruction instances, protocols, structures, and techniques are not necessarily shown in detail.

Network-based commerce systems allow a large number of users to sell or buy products and services. However, these systems typically have the effect that buyers do not know the sellers personally, nor will they be able to interact with a product prior to purchasing (e.g., a user cannot test out features on a camera through the Internet). As a result, buyers need to find alternative ways to evaluate products before purchasing. Network-based commerce systems can assist potential buyers by Encouraging users to leave feedback for products, services, and other users can result in increased usefulness for users by increasing the amount of information available for users to evaluate their purchasing decisions.

User interface choices that encourage users to leave feedback can improve network-based commerce sites. For example, when a user purchases a product from a network-based commerce system, the commerce presents one or more feedback options to the user (e.g., send a follow-up email or other message to a user after records show that the product has been delivered).

In some example embodiments, the network-based commerce system determines one or more questions associated with the product. In some example embodiments, the questions are determined based on product type, user interests, previous product feedback (e.g., text-mining user comments about the product to determine subjects of interest), product specifications, information provided by a producer of the product, and so on.

Once the one or more questions have been determined, the network-based commerce system presents the questions to the user as part of a web page generated by the network-based commerce system. Each question has an associated visual feedback image presented as part of a user feedback section of a displayed web page (this user feedback section of a displayed web page may be called an aspect card). In some example embodiments, the visual feedback image is a radial graph (e.g., an annulus that has a base color and a filled in section of another color representing a percentage or amount of the data being represented). In one example embodiment, the radial graph represents the portion of users who like Movie A. Thus, if forty percent of users like movie A the radial graph is an annulus (e.g., a circle with a concentric circle removed from the middle) with forty percent of the circle filled in with the color blue while the rest remains the color white.

Once the user responds to the one or more feedback questions by selecting one of the presented possible answers, the client system (at which the one or more feedback questions are displayed) transmits the information back to the network-based commerce system. In some example embodiments, there are two possible answers (e.g., yes or no). In other example embodiments, more than two options are displayed. The network-based commerce system updates feedback information in real-time based on a most recent user answer (e.g., an answer that was just received), and sends an update to the visual feedback image back to the client system for presentation to the user. Thus, the user sees the image update in real time based on the answer selected by the user. In this way, the user is more likely to give feedback.

With reference to FIG. 1, an example embodiment of a high-level client-server-based network architecture 100 is shown. A server system 120, in the example forms of a network-based publication system or payment system, provides server-side functionality via a network 104 (e.g., the Internet or wide area network (WAN)) to one or more client devices 102. FIG. 1 illustrates, for example, a web client 112 (e.g., a browser, such as the Internet Explorer® browser developed by Microsoft® Corporation of Redmond, Wash. State), client application(s) 114, and a programmatic client 116 executing on the client device 102.

The client device 102 may comprise, but is not limited to, a mobile phone, laptop, portable digital assistant (PDA), smartphone, tablet, ultra book, netbook, laptop, multi-processor system, microprocessor-based or programmable consumer electronics system, game console, set-top box, or any other communication device that a user, such as a user 106, may utilize to access the server system 120. In some embodiments, the client device 102 may comprise a display module (not shown) to display information (e.g., in the form of user interfaces). In further embodiments, the client device 102 may comprise one or more of a touch screen, accelerometer, gyroscope, camera, microphone, global positioning system (GPS) device, and so forth. The client device 102 may be a device of a user 106 that is used to perform a transaction involving items within the server system 120. In one embodiment, the server system 120 is a network-based marketplace that responds to requests for product listings, publishes publications comprising item listings of products available on the network-based marketplace, and manages payments for marketplace transactions. One or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 102 may include one or more applications (also referred to as "apps") such as, but not limited to, a web browser, messaging application, electronic mail (email) application, e-commerce site application (also referred to as a marketplace application), and the like. In some embodiments, if the e-commerce site application is included in the client device 102, then this application is configured to locally provide the user interface and at least some of the functionalities of an e-commerce site, with the application configured to communicate with the server system 120, on an as needed basis, for data or processing capabilities not locally available (e.g., to access a database of items available for sale, to authenticate a user, to verify a method of payment). Conversely, if the e-commerce site application is not included in the client device 102, the client device 102 may use its web browser to access the e-commerce site (or a variant thereof) hosted on the server system 120.

The one or more users 106 may be a person, a machine, or other means of interacting with the client device 102. For instance, the user 106 provides input (e.g., touch screen input or alphanumeric input) to the client device 102 and the input is communicated to the server system 120 via the network 104. In this instance, the server system 120, in response to receiving the input from the user 106, communicates information to the client device 102 via the network 104 to be presented to the user 106. In this way, the user 106 can interact with the server system 120 using the client device 102.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 128. The programmatic client 116 may, for example, be a seller application (e.g., the Turbo Lister application developed by eBay® Inc., of San Jose, Calif.) to enable sellers to author and manage listings on the server system 120 in an off-line manner, and to perform batch-mode communications between the programmatic client 116 and the server system 120.

An application program interface (API) server 128 and a web server 122 are coupled to, and provide programmatic and web interfaces respectively to, one or more application servers 140. The application server(s) 140 may host one or more publication systems 142, payment systems 144, and a feedback system 150, each of which may comprise one or more modules or applications and each of which may be embodied as hardware, software, firmware, or any combination thereof. The application server(s) 140 are, in turn, shown to be coupled to one or more database servers 124 that facilitate access to one or more information storage repositories or database(s) 126. In an example embodiment, the database(s) 126 are storage devices that store information to be posted (e.g., publications or listings) to the publication system(s) 142. The database(s) 126 may also store digital item information in accordance with example embodiments.

Additionally, a third party application 132, executing on third party server(s) 130, is shown as having programmatic access to the server system 120 via the programmatic interface provided by the API server 128. For example, the third party application 132, utilizing information retrieved from the server system 120, supports one or more features or functions on a website hosted by a third party. The third party website, for example, provides one or more promotional, marketplace, or payment functions that are supported by the relevant applications of the server system 120.

The publication system(s) 142 provides a number of publication functions and services to the users 106 that access the server system 120. The payment system(s) 144 likewise provides a number of functions to perform or facilitate payments and transactions. While the publication system(s) 142 and payment system(s) 144 are shown in FIG. 1 to both form part of the server system 120, it will be appreciated that, in alternative embodiments, each system 142 and 144 may form part of a service that is separate and distinct from the server system 120. In some embodiments, the payment system(s) 144 may form part of the publication system(s) 142.

In some example embodiments, the feedback system 150 provides functionality operable to allow and encourage users to give feedback for one or more products or services purchased by the user through a network-based commerce system. The feedback system 150 selects one or more feedback questions for each product/service. In some example embodiments, the feedback questions are based on the product type, the user, or other variables. In some cases the questions are specifically selected to have two possible answers (e.g., true/false, yes/no, a/b).

Once the feedback system 150 has selected the one or more feedback questions, the feedback system 150 transmits the questions to the client device 102 for presentation. In addition, the feedback system 150 transmits a feedback image for each of the selected one or more feedback questions. The feedback images are displayed to the user, along with the associated questions, on aspect cards to display previous feedback information to the user.

The feedback system 150 then receives feedback information from the user. For example, after device A has been delivered to a user, the feedback system 150 receives the user's answer to the question "Did Device A meet your battery life expectations?" The feedback system 150 updates the stored feedback information (e.g., stored in the database 126 at the server system 120) for the product.

The feedback system 150 sends an updated feedback image to the client device 102 based on the updated feedback information. In this way, the feedback image associated with a question is updated in real time based on the user's feedback. For example, a question for a camera has 4 responses, 2 positive and 2 negative. The associated graphic representation of the response data shows half positive and half negative responses. The user answers the question positively. The feedback image is updated to show 60 percent positive and 40 percent negative (e.g., three positive responses and two negative responses). Thus, the user is able to instantly see the results of answering the feedback question.

Further, while the client-server-based network architecture 100 shown in FIG. 1 employs client-server architecture, the present inventive subject matter is of course not limited to such an architecture, and could equally well find application in a distributed, or peer-to-peer, architecture system, for example. The various publication system(s) 142, payment system(s) 144, and feedback system 150 could also be implemented as standalone software programs, which do not necessarily have networking capabilities.

Figure 2:
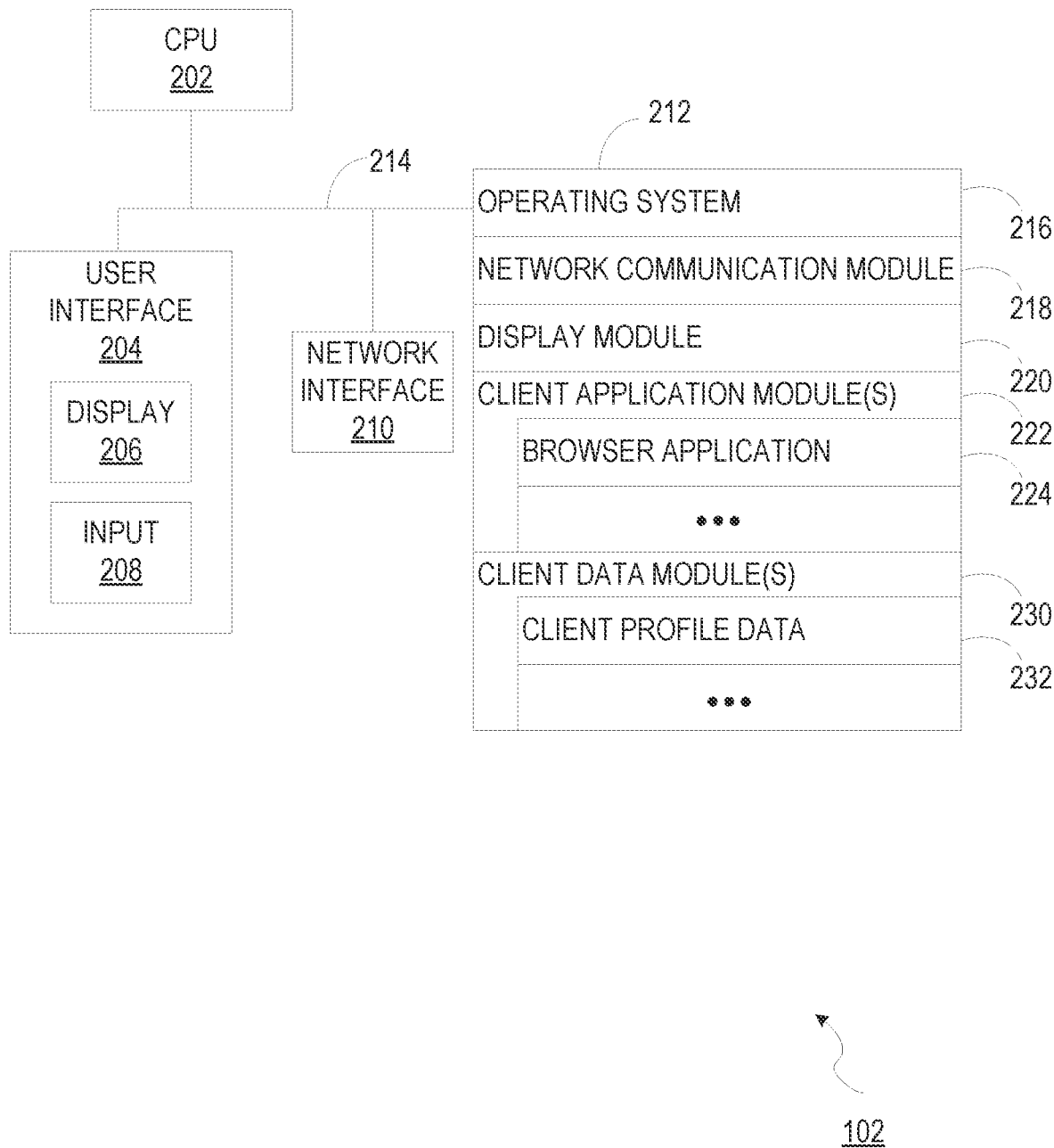
FIG. 2 is a block diagram further illustrating the client device of FIG. 1, in accordance with some example embodiments.

FIG. 2 is a block diagram further illustrating the client device 102, in accordance with some example embodiments. The client device 102 typically includes one or more central processing units (CPUs) 202, one or more network interfaces 210, memory 212, and one or more communication buses 214 for interconnecting these components. The client device 102 includes a user interface device 204. The user interface 204 includes a display device 206 and optionally includes an input device 208 such as a keyboard, mouse, touch sensitive display, or other input means. Furthermore, some client devices 102 use a microphone and voice recognition to supplement or replace other input devices.

The memory 212 includes high-speed random access memory, such as dynamic random-access memory (DRAM), static random access memory (SRAM), double data rate random access memory (DDR RAM) or other random access solid state memory devices, and may include non-volatile memory, such as one or more magnetic disk storage devices, optical disk storage devices, flash memory devices, or other non-volatile solid state storage devices. The memory 212 may optionally include one or more storage devices remotely located from the CPU(s) 202. The memory 212, or alternatively, the non-volatile memory device(s) within the memory 212, comprise(s) a non-transitory computer-readable storage medium.

In some example embodiments, the memory 212, or the computer-readable storage medium of the memory 212, stores the following programs, modules, and data structures, or a subset thereof:
- an operating system 216 that includes procedures for handling various basic system services and for performing hardware-dependent tasks;
- a network communication module 218 that is used for coupling the client device 102 to other computers via the one or more network interfaces 210 (wired or wireless) and one or more communication networks 104, such as the Internet, other WANs, LANs, MANs, etc.;
- a display module 220 for enabling the information generated by the operating system 216 and the client application(s) 114 to be presented visually on the display device 206;
- one or more client application modules 222 for handling various aspects of interacting with the server system 120 (FIG. 1), including but not limited to:
  - a browser application 224 for requesting information from the server system 120 (e.g., content items and listings) and receiving responses from the server system 120; and
- client data module(s) 230 for storing data relevant to the clients, including but not limited to:
  - client profile data 232 for storing profile data related to a user (e.g., user 106) of the server system 120 associated with the client device 102.

Figure 3:
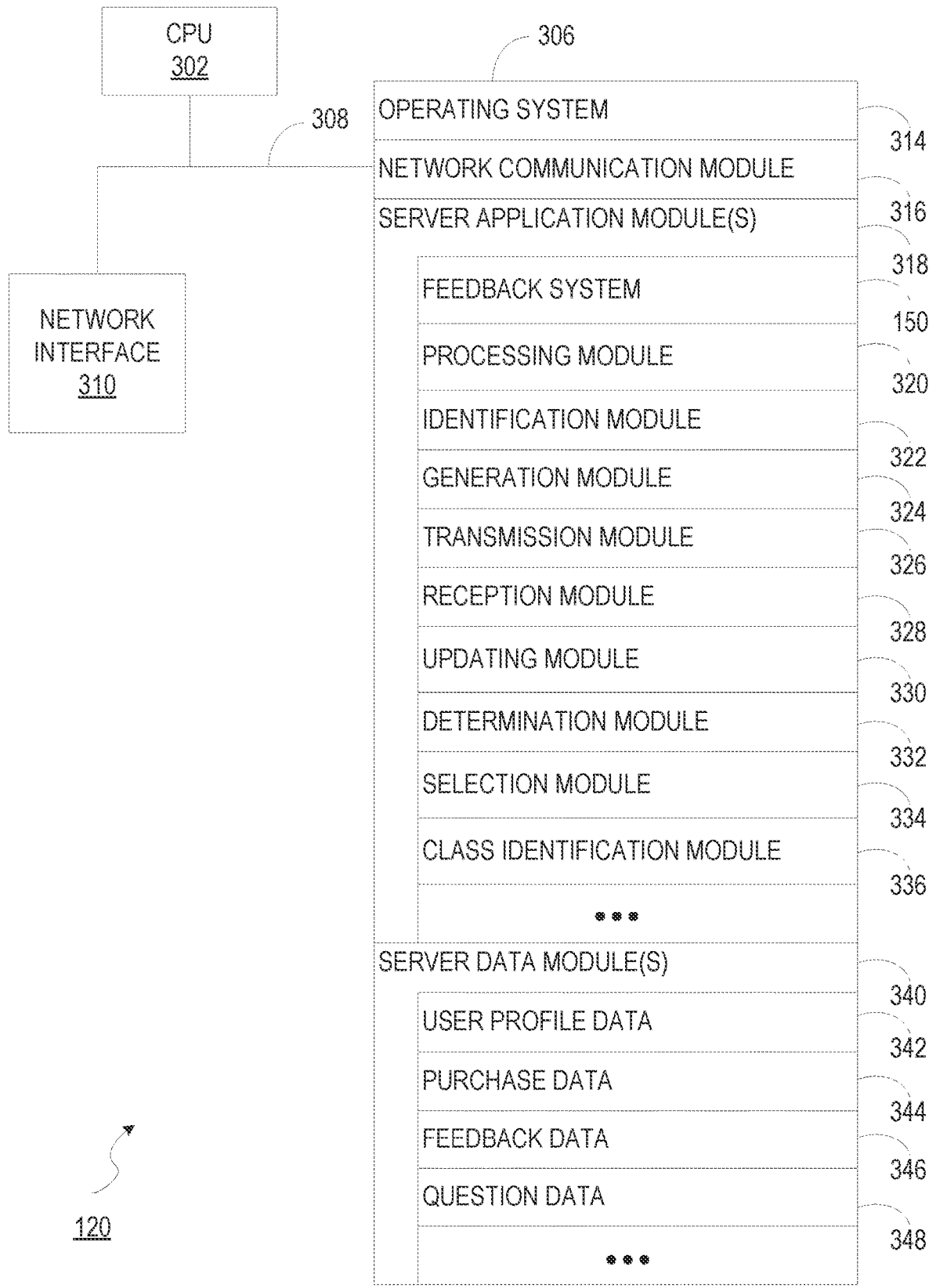
FIG. 3 is a block diagram further illustrating the server system of FIG. 1, in accordance with some example embodiments.

FIG. 3 is a block diagram further illustrating the server system 120, in accordance with some example embodiments. The server system 120 typically includes one or more CPUs 302, one or more network interfaces 310, memory 306, and one or more communication buses 308 for interconnecting these components. The memory 306 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. The memory 306 may optionally include one or more storage devices remotely located from the CPU(s) 302.

The memory 306, or alternately the non-volatile memory device(s) within the memory 306, comprises a non-transitory computer-readable storage medium. In some example embodiments, the memory 306, or the computer-readable storage medium of the memory 306, stores the following programs, modules, and data structures, or a subset thereof:
- an operating system 314 that includes procedures for handling various basic system services and for performing hardware-dependent tasks;
- a network communication module 316 that is used for coupling the server system 120 to other computers via the one or more network interfaces 310 (wired or wireless) and one or more communication networks 104, such as the Internet, other WANs, LANs, MANs, and so on;

one or more server application modules 318 configured to perform the services offered by the server system 120, including but not limited to:

a feedback system 150 for, based on a product that is purchased through the server system 120, sending one or more user feedback questions to a user to receive user feedback for the purchased product;

a processing module 320 for receiving a user request to purchase a product through the network-based commerce system associated with the server system 120;

an identification module 322 for identifying one or more user feedback question associated with a particular product based on the product type and user preferences;

a generation module 324 for generating a user feedback image for each identified user feedback question;

a transmission module 326 for transmitting one or more selected user feedback questions and a user feedback image for each of the user feedback questions;

a reception module 328 for receiving user feedback for a user feedback question in the selected one or more user feedback questions;

an updating module 330 for updating a user feedback image based on received user feedback for a product;

a determination module 332 for determining whether a particular product already has one or more predetermined associated user feedback questions;

a selection module 334 for selecting one or more user feedback questions from a plurality of user feedback questions based on the amount of user feedback for each question and the preferences of the user; and a class identification module 336 for determining, for a particular product, a product class to which the product belongs, based on characteristics of the particular product including but not limited to the category of the product, the specifications of the product, the uses of the product, and so on; and server data module(s) 340, storing data related to the server system 120, including but not limited to:

user profile data 342, including both data provided by the user, who will be prompted to provide some personal information, such as his or her name, age (e.g., birth date), gender, interests, contact information, home town, address, educational background (e.g., schools, majors), current job title, job description, industry, employment history, skills, professional organizations, memberships to other social networks, customers, past business relationships, and seller preferences; and inferred user information based on user activity, social graph data, remaining power threshold value, and so on;

purchase data 344 for storing purchase requests of users for products through a network-based commerce system associated with the server system 120;

feedback data 346 including data from one or more users that gives feedback for products offered through a network-based commerce system associated with the server system 120; and question data 348 for storing user feedback questions associated with various products available through a network-based commerce system associated with the server system 120.

Figure 4A:
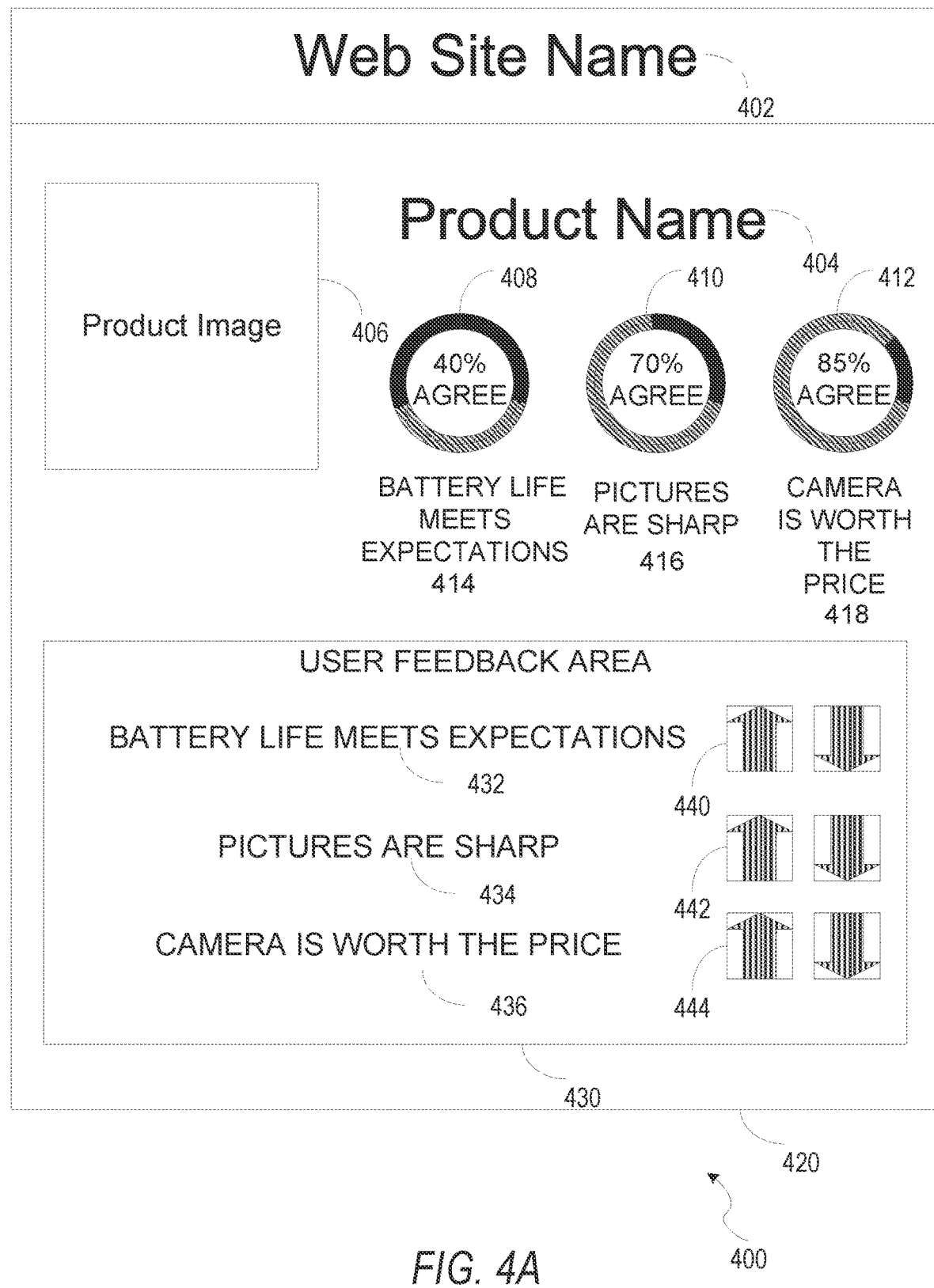
FIGS. 4A-4C illustrate an exemplary user interface for a product feedback page of a network-based commerce website.

FIG. 4A illustrates an exemplary user interface 400 for a product feedback page 420 of a network-based commerce website. In this example the user interface 400 includes a title bar 402 that displays the name of a website. Below the title bar 402 are a product name 404 and one or more product images 406. Both the product name 404 and the product image 406 serve to help identify the product being reviewed (e.g., so that the user is able to easily remember the product for which feedback is being requested). The user interface 400 also includes a user feedback area 430. In this example user interface 400, the user feedback area 430 includes one or more user feedback questions 432, 434, and 436. In this example, each user feedback question 432, 434, and 436 has two possible answers (e.g., a yes or no question), although in other examples more than two options may be displayed. In addition, each user feedback question 432, 434, and 436 has one or more associated user selectable question feedback links (e.g., up/down arrows 440, 442, and 444). The user can select one of the two feedback links in response to each associated question.

For example, for the feedback question 432 "battery life meets expectations," the user wants to answer "yes." The user clicks on the up arrow 440 associated with the feedback question 432.

The user interface 400 also includes a feedback image area. The feedback image area includes a feedback image 408, 410, and 412 for each user feedback question 432, 434, and 436. Each feedback image 408, 410, and 412 further includes a label 414, 416, and 418 (e.g., text of the associated feedback question or text similar thereto). The labels 414, 416, and 418 are positioned below the feedback images with which are they are associated.

In some example embodiments, each feedback image represents a percentage of users who have answered affirmatively to the user feedback question associated with the image. In this example, the percentage is shown both as text in the image and as a radial graph (e.g., a donut-shaped graph with the given percentage filled in).

Figure 4B:
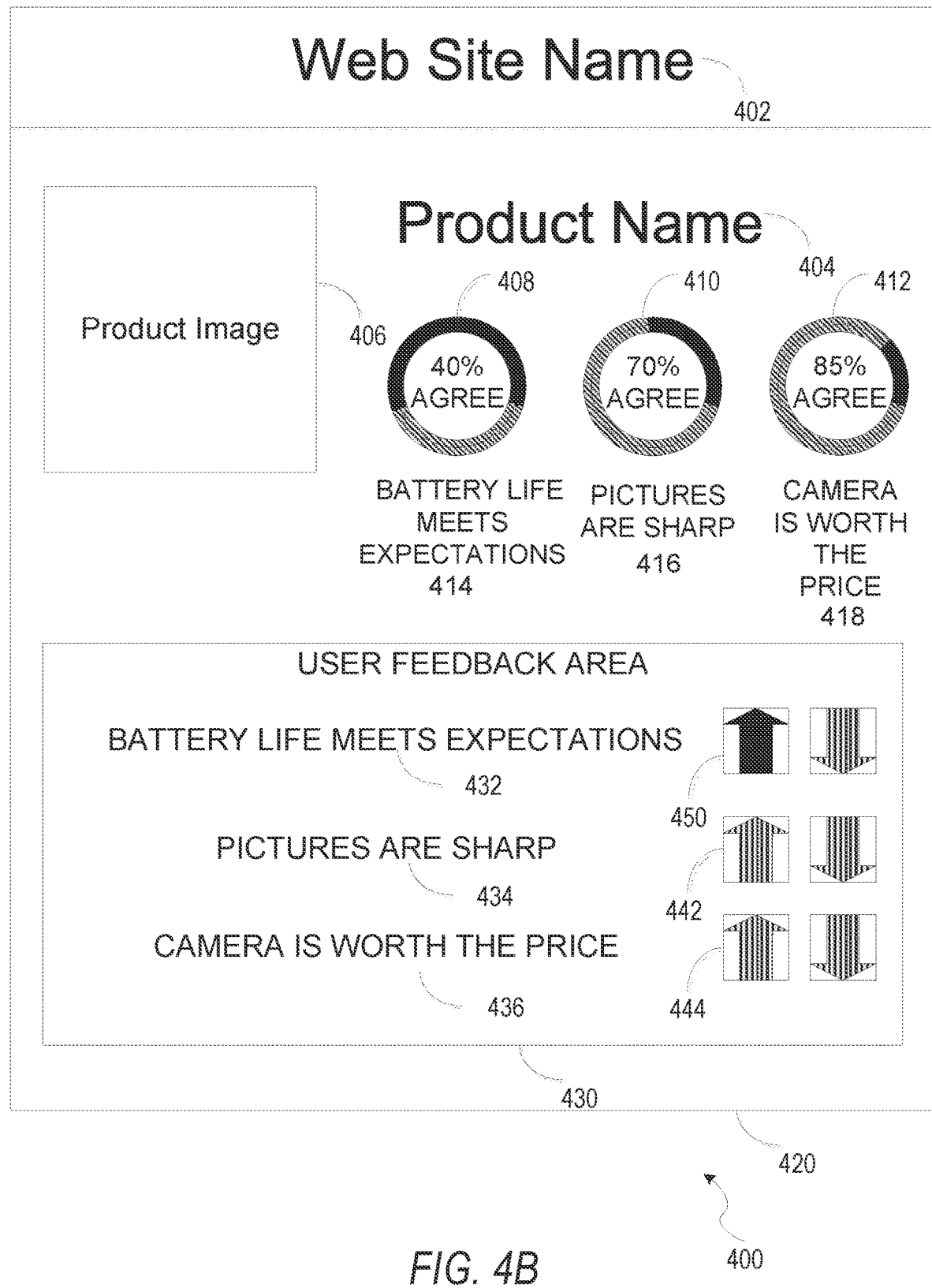

FIG. 4B illustrates the exemplary user interface 400 for the product feedback page 420 of the network-based commerce website. In this example the user interface 400 includes the title bar 402 that displays the name of the website. Below the title bar 402 are the product name 404 and one or more product images 406.

In this example, the user has clicked the positive link 450 (e.g., the up arrow) in response to the feedback question 432 "Battery life meets expectations." In response, the user interface 400 is updated to visually distinguish the selected link (e.g., the up arrow is now black rather than grey). The feedback is also sent to the server system 120 for recording.

Figure 4C:
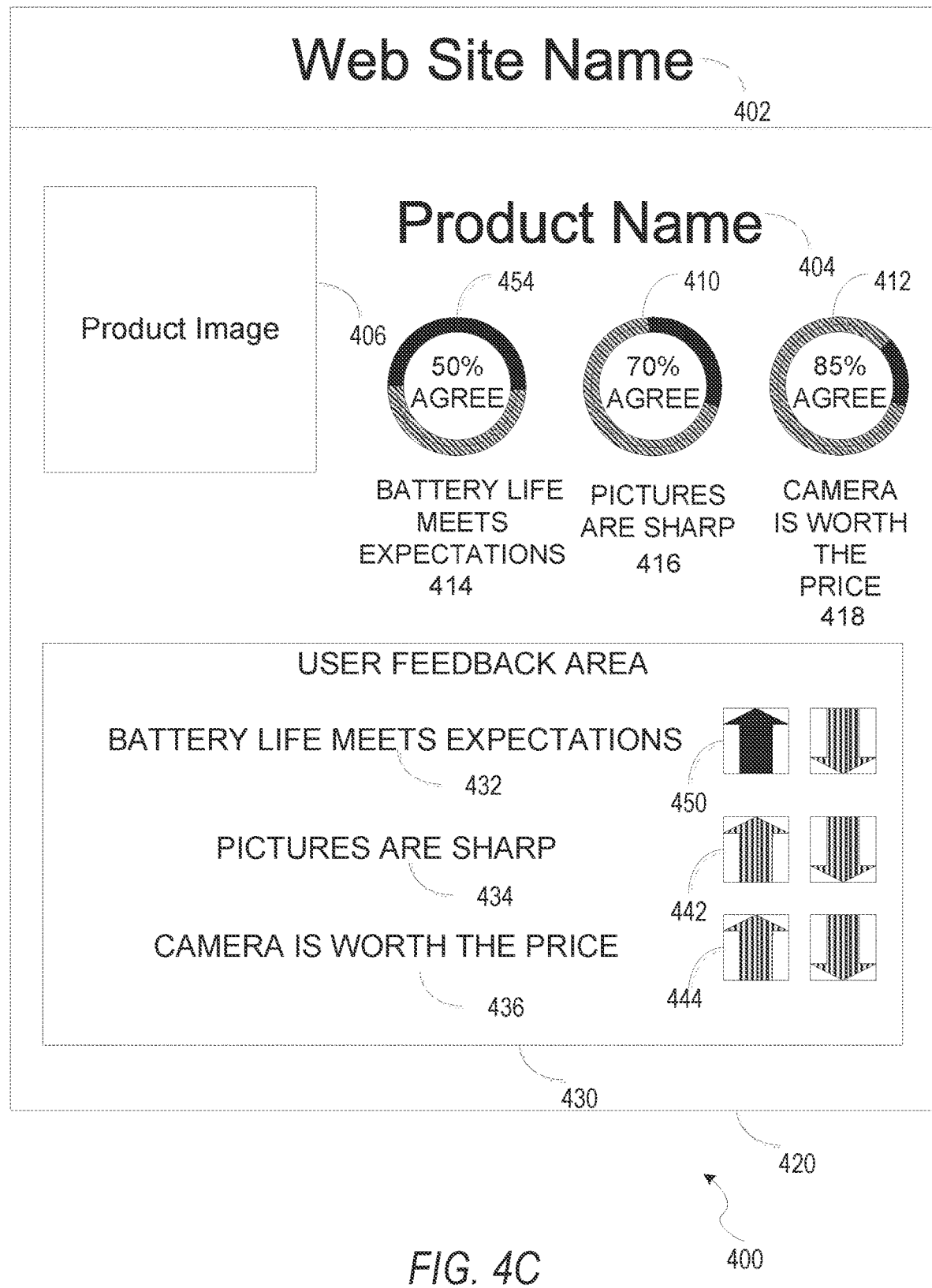

FIG. 4C illustrates the exemplary user interface 400 for the product feedback page 420 of the network-based commerce website. In this example the user interface 400 includes the title bar 402 that displays the name of the website. Below the title bar 402 are the product name 404 and one or more product images 406.

In this example, the user has clicked the positive link 450 (e.g., the up arrow) in response to the feedback question 432 "Battery life meets expectations". In response, the server system (e.g., server system 120 in FIG. 1) sends an updated feedback image 454 to the user interface 400 that includes the feedback data submitted by the user.

Figure 5A:
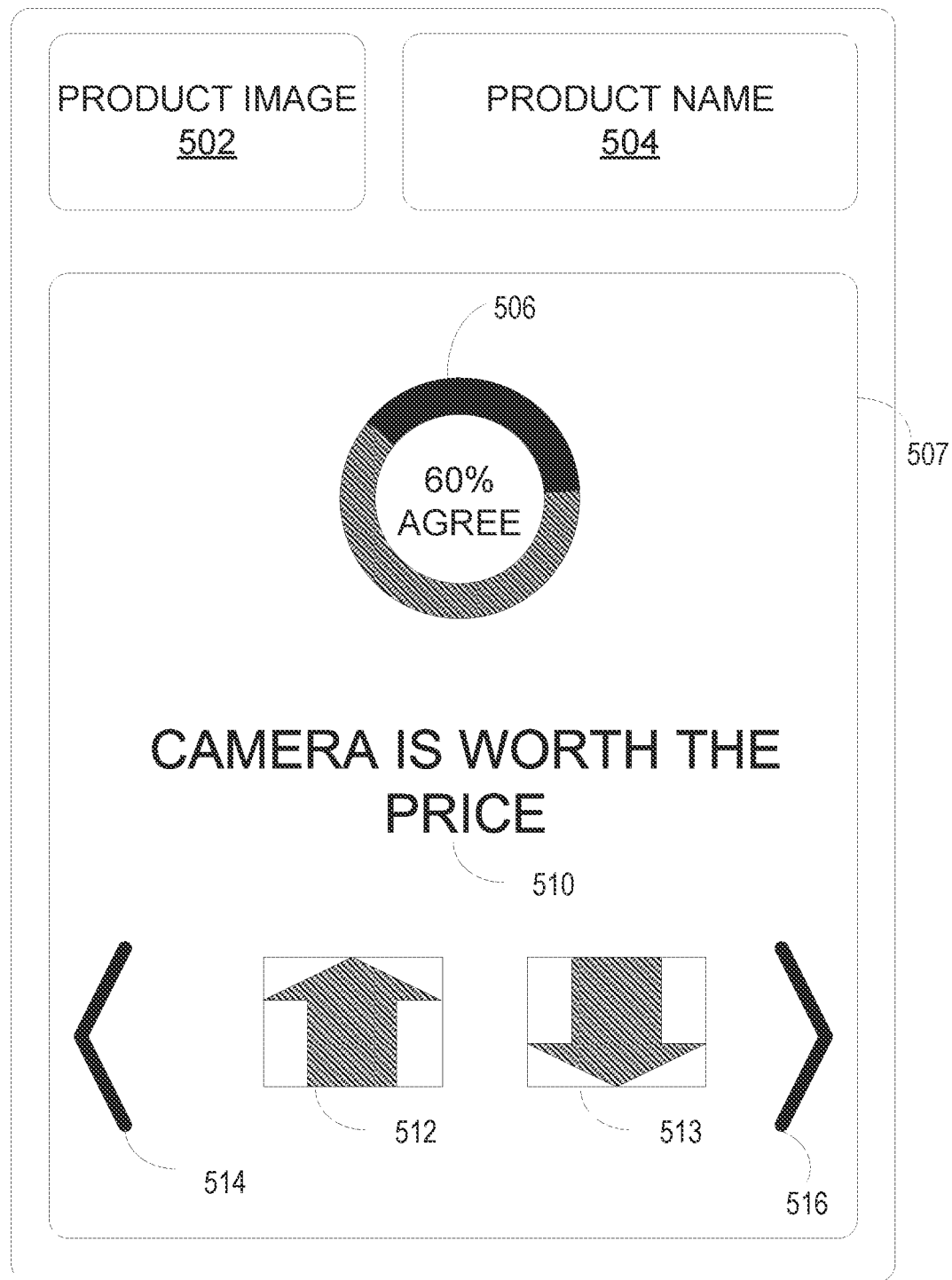
FIGS. 5A-5C illustrate an exemplary user interface for a mobile device (e.g., a smartphone) for a product feedback page of a network-based commerce website.

FIG. 5A illustrates an exemplary user interface 500 for a mobile device (e.g., a smartphone) for a product feedback page of a network-based commerce website. In this example, the user interface 500 includes a product name 504 and a product image 502. Both the product name 504 and the product image 502 serve to help identify the product being reviewed (e.g., so that the user is able to easily remember the product being for which feedback is requested). The user interface 500 includes area in the user interface used to receive user feedback on a particular product or aspect of a product 507 (e.g., an aspect card). The area in the user interface used to receive user feedback on a particular product or aspect of a product will be referred to as an aspect card at some points in the specification. The aspect card 507 includes a product feedback image 506 that includes a percentage of users that have agreed with an associated user feedback question. In other example embodiments, the product feedback image 506 includes the number of users who agreed from the total number of users giving feedback. For example, the product feedback image 506 reports that 15/17 users answered this question Yes.

The aspect card 507 also includes a user feedback question 510 associated with the displayed product feedback image 506. In this example, the user feedback question 510 is "Camera is worth the price." Below the user feedback question 510 two symbols are displayed (an up arrow 512 and a down arrow 513), one of which is associated with agreeing with the user feedback question 510 (up arrow 512), and one of which is associated with disagreeing the user feedback question 510 (down arrow 513). The aspect card 507 also includes one or more links to other aspect cards associated with the product (e.g., left and right indicators 514 and 516). In some example embodiments, the aspect cards are prioritized based on the number of users that have previously answered the questions on the aspect cards (e.g., so that questions with few answers can get more answers), the importance of the questions, the popularity of the questions, and so on.

Figure 5B:
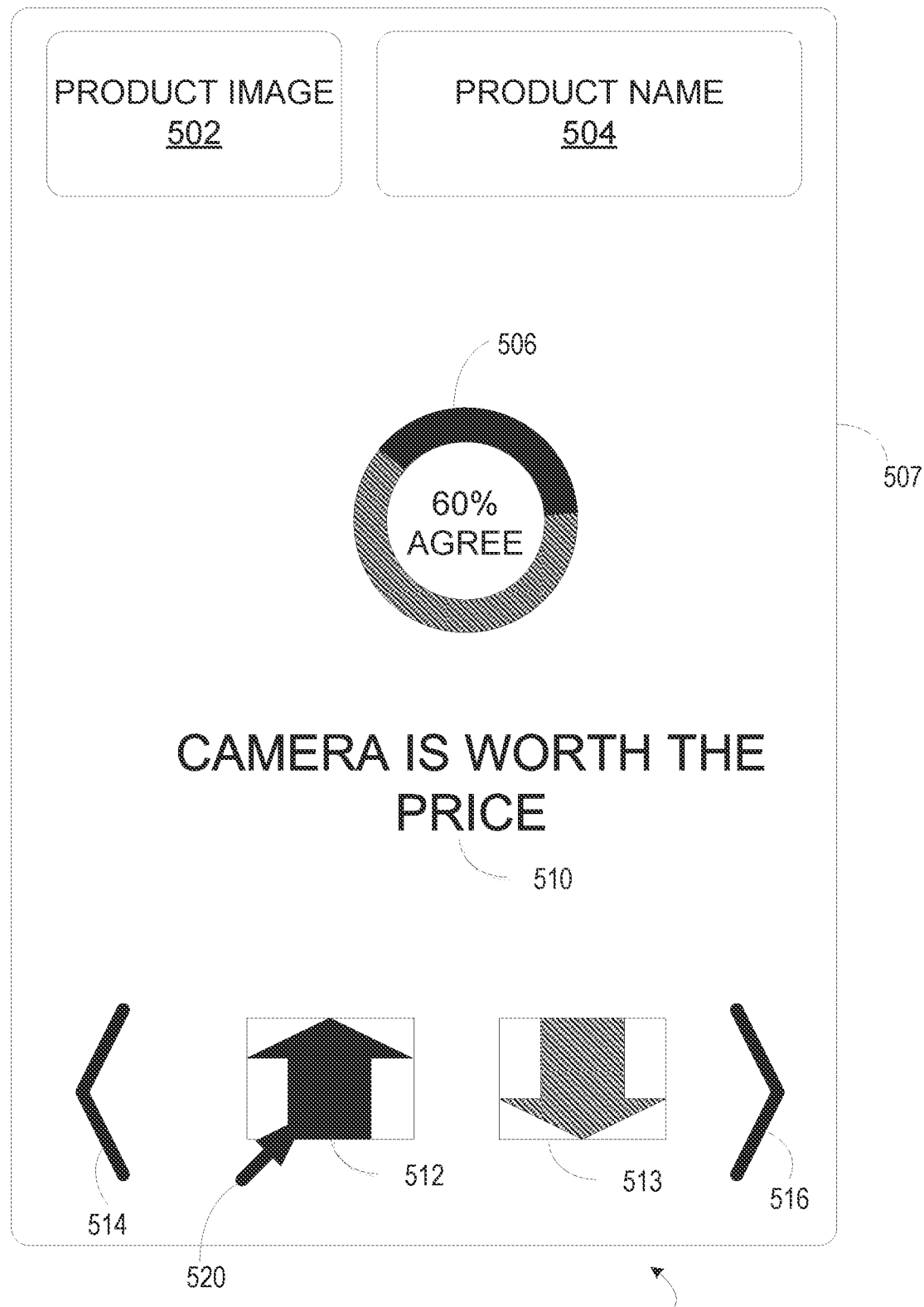

FIG. 5B illustrates an example user interface 500 for the mobile device (e.g., a smartphone) for the product feedback page of the network-based commerce website. In this example, the user interface 500 includes the product name 504 and the product image 502. Below the product name 504 and product image 502, the user interface 500 includes the aspect card 507 (e.g., user interface element related to specific aspect of a product).

In this example, the user has clicked (or tapped) the up arrow 512 (as shown by selection arrow 520) in response to the feedback question 510 "Camera is worth the price." In response, the user interface 500 is updated to visually distinguish the selected link (e.g., the up arrow 512 is now black rather than grey). The feedback is also sent to the server system 120 for recording.

Figure 5C:
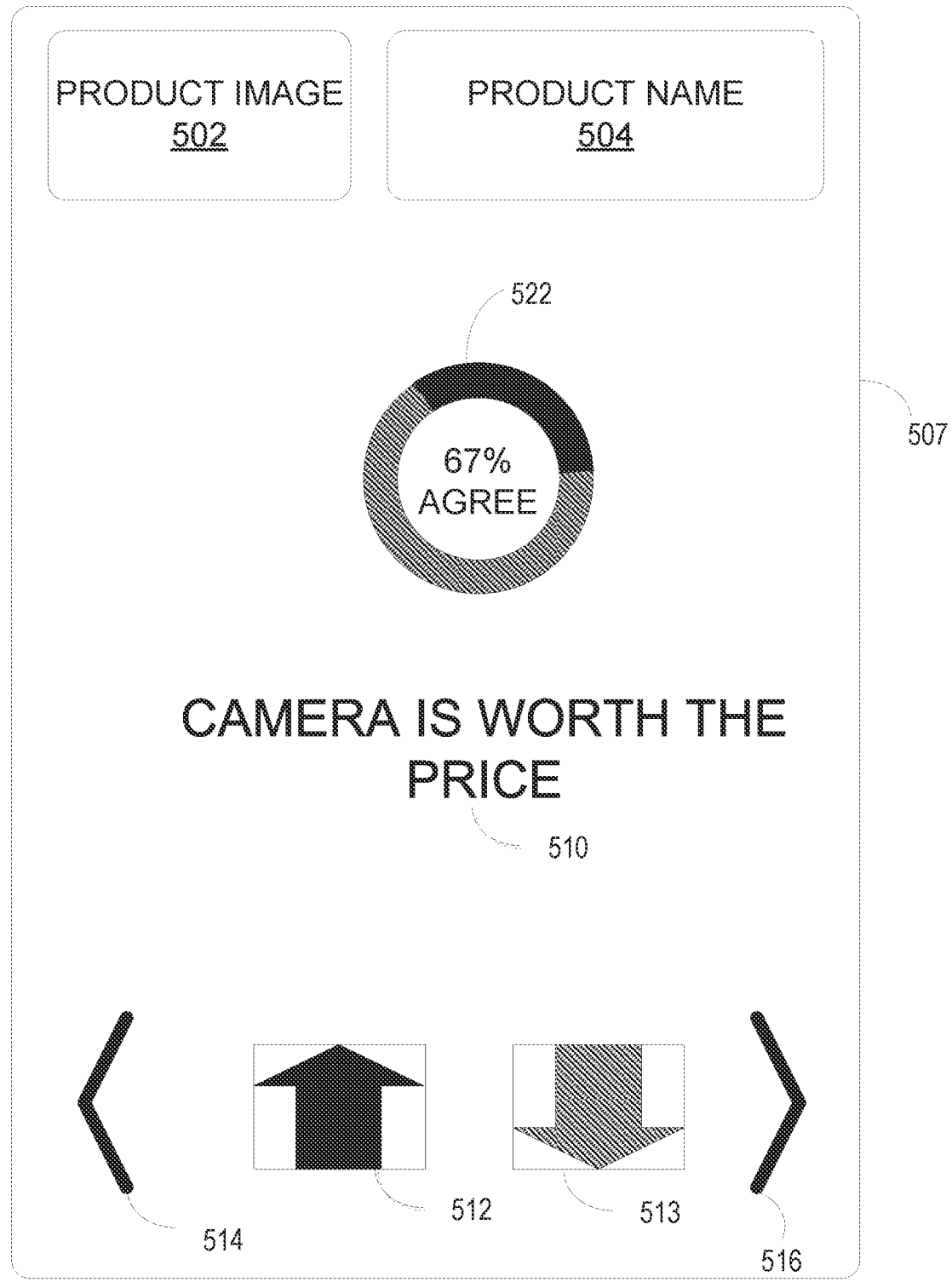

FIG. 5C illustrates the exemplary user interface 500 for the mobile device (e.g., a smartphone) for the product feedback page of the network-based commerce website. In this example the user interface 500 includes the product name 504 and the product image 502. Below the product name 504 and product image 502, the user interface 500 includes the aspect card 507 (e.g., user interface element related to specific aspect of a product).

In this example, the user has clicked (or tapped) the up arrow 512 in response to the user feedback question 510 "Camera is worth the price." In response, the server system (e.g., server system 120 in FIG. 1) sends an updated feedback image 522 to the user interface 500 that includes the feedback data submitted by the user.

Figure 6:
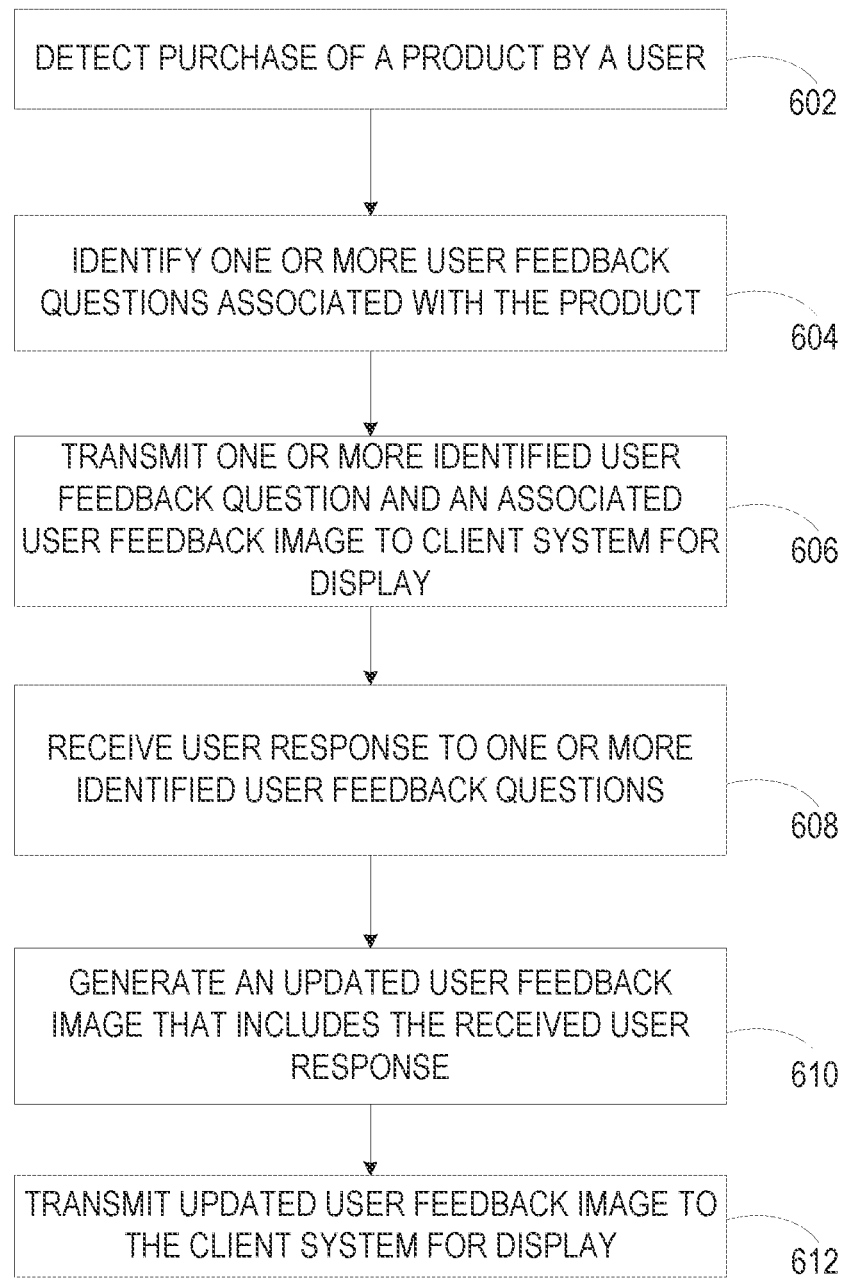
FIG. 6 is a flow diagram illustrating a method, in accordance with some example embodiments, for producing a product review user interface that encourages users to give feedback for items purchased over a network-based commerce system.

FIG. 6 is a flow diagram illustrating a method 600, in accordance with some example embodiments, for producing a product review user interface that encourages users to give feedback for items purchased over a network-based commerce system. Each of the operations shown in FIG. 6 may correspond to instructions stored in a computer memory or machine-readable storage medium. In some embodiments, the method 600 described in FIG. 6 is performed by a server system (e.g., server system 120 in FIG. 1). However, the method 600 can also be performed by any other suitable configuration of electronic hardware.

In some example embodiments, the method 600 is performed at a server system (e.g., server system 120 in FIG. 1) including one or more processors and memory storing one or more programs for execution by the one or more processors.

In some example embodiments, the server system (e.g., server system 120 in FIG. 1) detects, in operation 602, a purchase of a product by a user of the network-based commerce system. For example, each time a product is purchased, the server system 120 detects that purchase and responds to it.

In some example embodiments, the server system (e.g., server system 120 in FIG. 1) responds by identifying, in operation 604, one or more user feedback questions associated with the product. For example, user feedback questions for a product are related to how well the product accomplishes its purpose, its value for the price, the user's opinion of the product's attributes, and so on. The server system identifies one or more user feedback questions for each product that are appropriate for the product. The server system 120 accesses a database of user feedback questions using a product identification number for a particular product to determine whether the product has specific question already predetermined.

If the server system (e.g., server system 120 in FIG. 1) determines that the user feedback database includes no user feedback questions that are specifically associated with the product, the server system 120 then determines whether a product group to which the product belongs has associated user feedback questions. For example, if the specific product is a GameStation 3 and the server system 120 determines that there are no specific user feedback questions associated with the GameStation 3, the server system 120 then determines whether there are user feedback questions associated with video game consoles generally, such as "Plays games at a good resolution."

Once the server system (e.g., server system 120 in FIG. 1) determines one or more user feedback questions, the server system 120 transmits, in operation 606, the determined user feedback questions and an associated user feedback image for each question to the client system 120 for display. A user feedback image for a user feedback question is a visual representation of the user feedback for the user feedback question.

The server system (e.g., server system 120 in FIG. 1) receives, in operation 608, user feedback in response to the one or more identified user feedback questions. For example, the user selects one of two possible responses and the client device 102 transmits the selected response to the server system 120.

In some example embodiments, the server system (e.g., server system 120 in FIG. 1) generates, in operation 610, an updated user feedback image that includes the received user response data. For example, if a user feedback question had five responses, three positive and two negative, the original user feedback image shows 60% user approval. The user then submits a positive response and the server system 120 generates an updated user feedback image that indicates the new approval rate of 67%.

In some example embodiments, the server system (e.g., server system 120 in FIG. 1) transmits, in operation 612, the updated user feedback image to the client system (e.g., client device 102) for display.

Figure 7A:
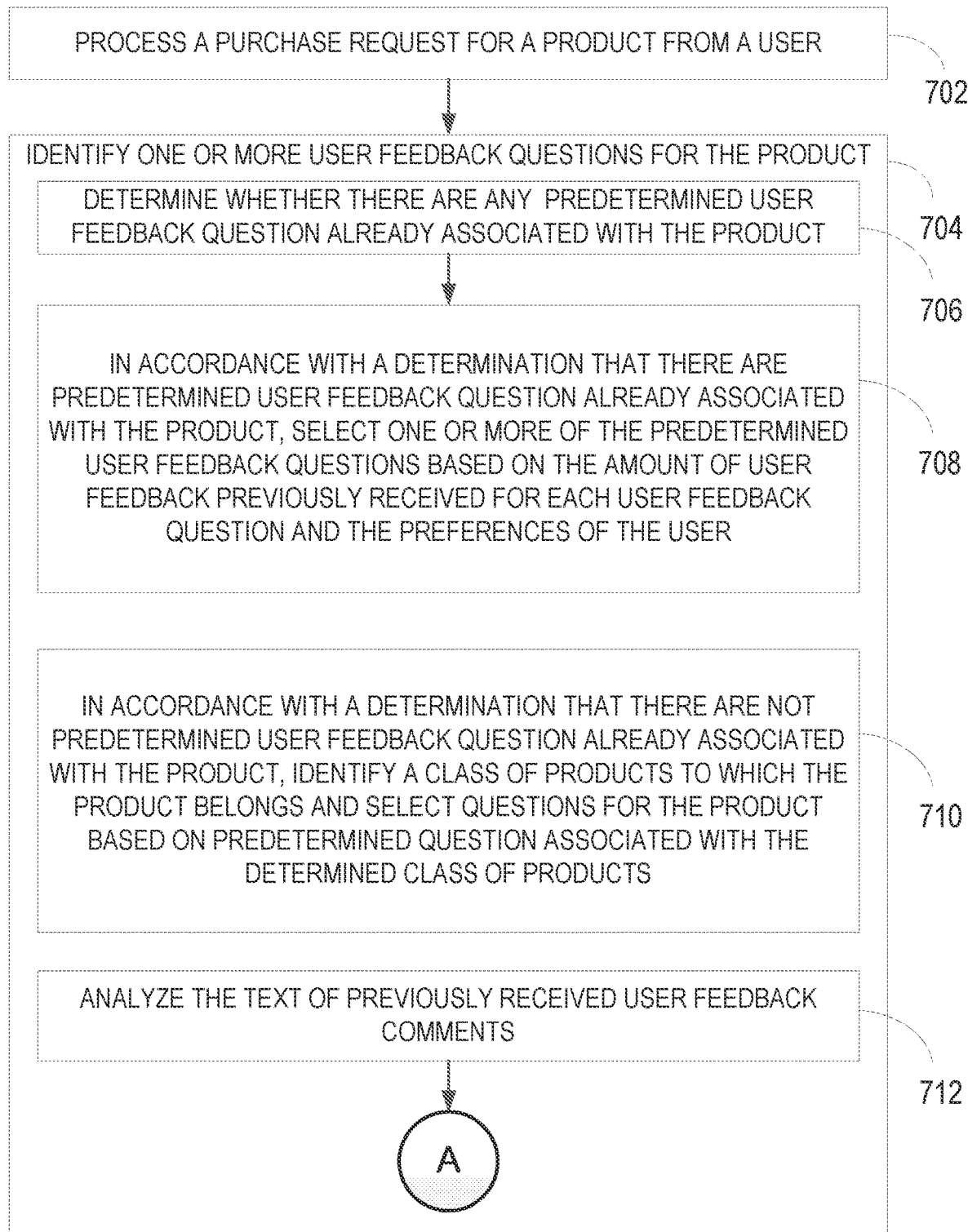
FIGS. 7A-7B are a flow diagram illustrating a method, in accordance with some example embodiments, for producing a product review user interface that encourages users to give feedback for items purchased over a network-based commerce system.

FIG. 7A is a flow diagram illustrating a method 700, in accordance with some example embodiments, for producing a product review user interface that encourages users to give feedback for items purchased over a network-based commerce system. Each of the operations shown in FIG. 7A may correspond to instructions stored in a computer memory or computer-readable storage medium. In some embodiments, the method described in FIG. 7A is performed by a server system (e.g., server system 120 in FIG. 1). However, the method described can also be performed by any other suitable configuration of electronic hardware.

In some embodiments, the method 700 is performed at a server system (e.g., server system 120 in FIG. 1) including one or more processors and memory storing one or more programs for execution by the one or more processors.

The server system (e.g., server system 120 in FIG. 1) processes, in operation 702, a purchase request for a product from a user. For example, any time a user purchases a product through the network-based commerce system, the purchase is noted by the server system (e.g., server system 120 in FIG. 1).

In response to detecting that a product has been purchased, the server system (e.g., server system 120 in FIG. 1) prepares to request user feedback from the user for the product that was purchased. This request can be delivered to the user immediately or at a later time. The request can be sent via email or through a messaging service of the network-based commerce system.

In some example embodiments, the server system (e.g., server system 120 in FIG. 1) identifies, in operation 704, one or more user feedback questions for the product. Identifying the one or more user feedback questions includes the server system (e.g., server system 120 in FIG. 1) determining, in operation 706, whether there are any predetermined user feedback questions already associated with the product. The server system (e.g., server system 120 in FIG. 1) stores a database of user feedback question. Each question in the database is associated with one or more products or product categories.

The server system (e.g., server system 120 in FIG. 1) uses the product identification number of the particular product to search the user feedback question database to determine predetermined questions associated with the product. For example, Camera A has two user feedback questions, "Pictures are clear" and "Camera features are easy to use."

In some example embodiments, each user feedback question has two user-selectable responses. For example, the user feedback questions are questions that can be answered with one of two answers, such as yes/no or true/false.

In accordance with a determination that there are predetermined user feedback questions already associated with the product, the server system (e.g., server system 120 in FIG. 1) selects, in operation 708, one or more of the predetermined user feedback questions based on the amount of user feedback previously received for each user feedback question and the preferences of the user. For example, if the user's preferences indicate that the user values battery life highly when evaluating electronic products, the server system 120 is more likely to select user feedback questions related to battery life.

In some example embodiments, a predetermined number of questions can be displayed simultaneously and only the number of user feedback questions that can be simultaneously displayed are selected.

In some example embodiments, if there are more available questions for a particular product than are needed, the server system (e.g., server system 120 in FIG. 1) selects the user feedback questions that have the fewest received responses. In other example embodiments, the user feedback questions are ranked by topic based on the preferences of the user who purchased the product. For example, if a particular user is price sensitive, user feedback questions associated with the price of a product are ranked more highly than other user feedback questions.

In some example embodiments, user feedback questions are selected based on a determination of the relative importance of the questions in evaluating a product. In some example embodiments, the server system (e.g., the server system 120 in FIG. 1) determines, for each user feedback question, the relative impact the user feedback question has on future user purchase decisions.

For example, the server system (e.g., the server system 120 in FIG. 1) analyzes the purchase trends for cameras to determine which user feedback questions were most predictive of user purchase decisions. It determines that Question A was very important to user purchase decisions for cameras because cameras that scored highly on Question A sold a high number of units while cameras that scored lowly on Question A sold a low number of units. In contract Question B was not important to user purchase decisions because cameras that scored highly on Question B sold at similar levels to cameras that scored lowly on Question B, when controlled for other factors. In this example, Question A would be determined to be more important than Question B.

In other example embodiments, the server system (e.g., the server system 120 in FIG. 1) selects questions that are not considered to have reached consensus. For example, if Question C has a high number of high ratings and a high number of low ratings, but relatively few intermediate ratings, the server system (e.g., the server system 120 in FIG. 1) determines that no consensus has been reached for the question and will prioritize Question C for further feedback.

In accordance with a determination that there are no predetermined user feedback questions already associated with the product, the server system (e.g., server system 120 in FIG. 1) identifies, in operation 710, a class of products to which the product belongs and selects questions for the product based on predetermined questions associated with the determined class of products. For example, smartphone C has no specific associated user feedback questions, so the server system 120 identifies one or more user feedback questions associated with smartphones generally.

In some example embodiments, products are pre-arranged into a hierarchical product classification system (such as a classification tree) with broader groups higher up in the classification system and more specific and narrow groups lower in the hierarchical classification system. In some example embodiments, to identify a class of products to which a particular product belongs, the server system (e.g., the server system 120 in FIG. 1) navigates to parent classes for the particular product. The parent classes in the hierarchical classification system then server as broader classes of products to which the particular product belongs.

In other example embodiments, the server system (e.g., the server system 120 in FIG. 1) parses the description and specifications of a particular product to identify one or more keywords or descriptors. The server system (e.g., the server system 120 in FIG. 1) can then match the determined keywords or descriptors to one or more other products and, based on the level of match, group the particular product into a class of products.

In some example embodiments, the server system (e.g., server system 120 in FIG. 1) analyzes, in operation 712, the text of previously received user feedback comments. For example, the server system (e.g., server system 120 in FIG. 1) identifies one or more user comments and counts the number of times each word occurs.

Figure 7B:
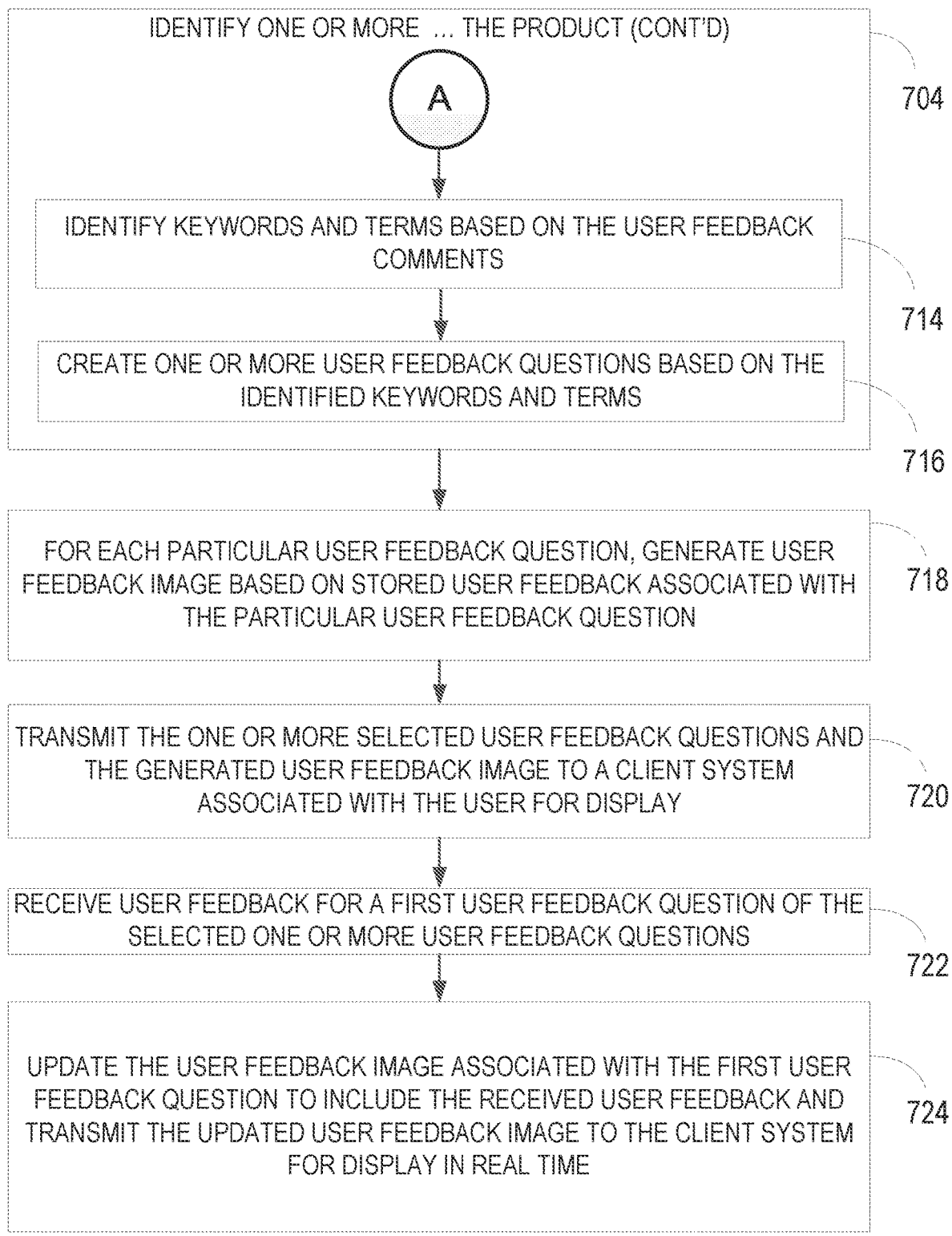

FIG. 7B is a flow diagram illustrating the method 700, in accordance with some example embodiments, for producing the product review user interface that encourages users to give feedback for items purchased over the network-based commerce system. Each of the operations shown in FIG. 7B may correspond to instructions stored in a computer memory or computer-readable storage medium. In some embodiments, the method described in FIG. 7B is performed by the server system (e.g., server system 120 in FIG. 1). However, the method described can also be performed by any other suitable configuration of electronic hardware. FIG. 7B is a continuation of the method 700 in FIG. 7A.

In some embodiments the method is performed at a server system (e.g., server system 120 in FIG. 1) including one or more processors and memory storing one or more programs for execution by the one or more processors.

In some example embodiments, the server system (e.g., server system 120 in FIG. 1) identifies, in operation 714, keywords and terms based on the user feedback comments. For example, keywords are determined based on the frequency of each word's appearance when compared against expected word frequencies. The server system 120 creates, in operation 716, one or more user feedback questions based on the identified keywords and terms.

In some example embodiments, creating feedback questions includes parsing the product descriptions and specifications to determine one or more keywords or descriptors. In some example embodiments, the keywords or descriptors are then inserted into one or more feedback question templates (e.g. "The {insert keyword} was satisfactory"). More complicated templates can be used to generate more accurate and appropriate user feedback questions by associated particular templates with particular product groups.

For each particular user feedback question, the server system (e.g., server system 120 in FIG. 1) generates, in operation 718, a user feedback image based on stored user feedback associated with the particular user feedback question. The user feedback image is a graphic that represents a percentage of users who have selected each possible response to the particular user feedback question. For example, if the user feedback question is "The product provides good quality for the money," the user feedback image will represent the percentage of users that answered yes and the percentage of users that answered no.

In some example embodiments, generating a user feedback image includes determining a particular type of user feedback image. For example, assume a pie chart is the determined user feedback image. The server system (e.g., the server system 120 in FIG. 1) then assigns a particular color to each potential answer of the user feedback question. The server system (e.g., the server system 120 in FIG. 1) then fills in the pie chart using previously received user feedback data such that each respective answer receives an appropriate area of the pie chart based on the percentage of the users that responded with the particular answer.

In some example embodiments, the server system (e.g., server system 120 in FIG. 1) transmits, in operation 720, the one or more selected user feedback questions and the generated user feedback images to a client system associated with the user for display. The server system (e.g., server system 120 in FIG. 1) then receives, in operation 722, user feedback for a user feedback question of the selected one or more user feedback questions.

In some example embodiments, the server system (e.g., server system 120 in FIG. 1) updates, in operation 724, the user feedback image associated with the first user feedback question to include the received user feedback and transmits the updated user feedback image to the client system for display in real time.

In some example embodiments, the number of total user reviews already received would result in a very small change to the displayed user feedback question. For example, if 1200 users had already answered the user feedback question, it is unlikely that a given user's feedback would have a significant impact on the displayed image (e.g., the graph would have a very small change or no change at all if moving from 66.05 percent to 66.08 percent). In this case, the server system (e.g., the server system 120 in FIG. 1) can update the user feedback image to indicate the user's feedback had been incorporated by adding a check mark or changing color from a first color to a second color.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 4-7 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 8:
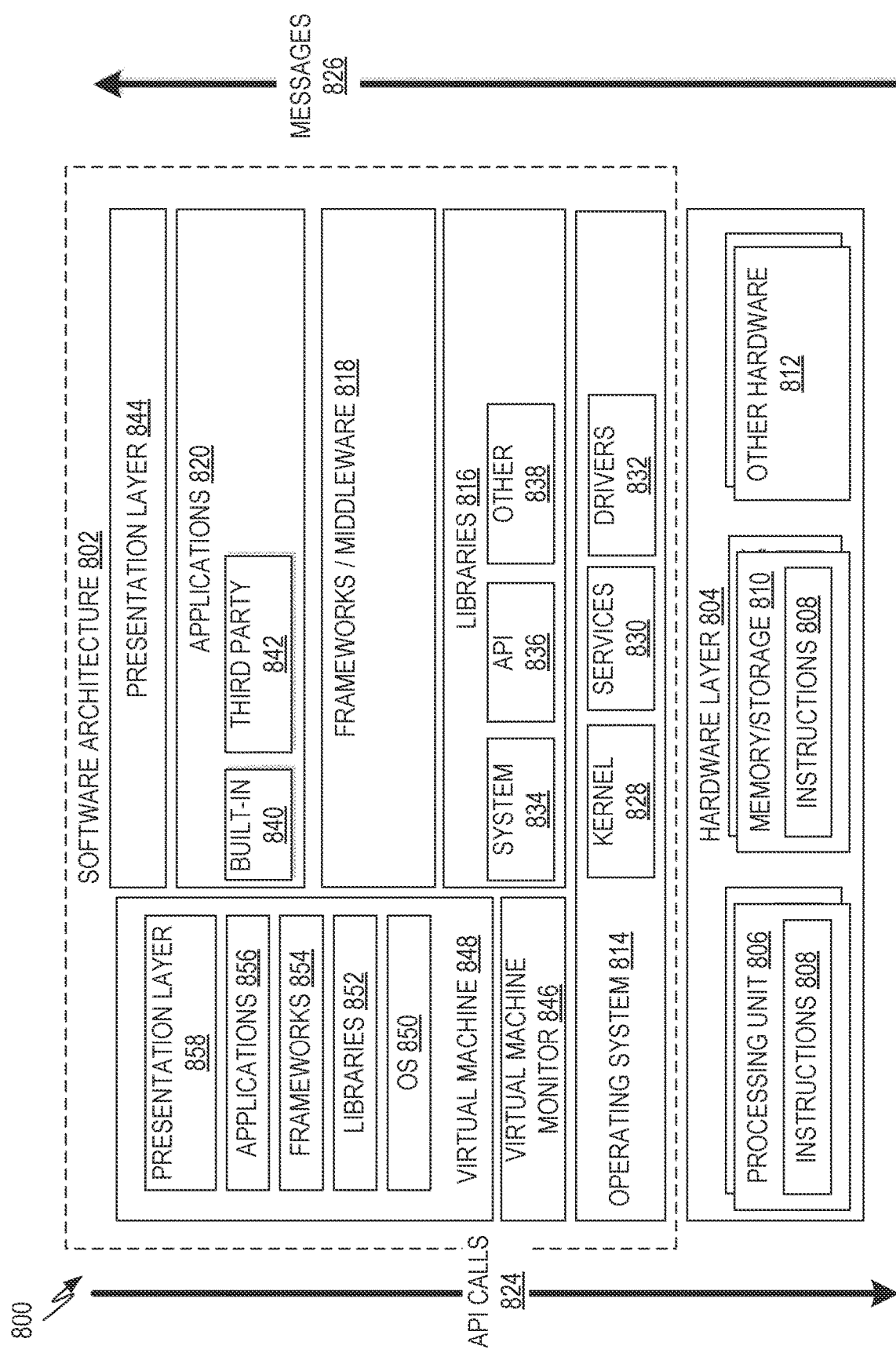
FIG. 8 is a block diagram illustrating an example of a software architecture that may be installed on a machine, according to some example embodiments.

FIG. 8 is a block diagram 800 illustrating a representative software architecture 802, which may be used in conjunction with various hardware architectures herein described. FIG. 8 is merely a non-limiting example of a software architecture 802 and it will be appreciated that many other architectures may be implemented to facilitate the functionality described herein. The software architecture 802 may be executing on hardware such as a machine 900 of FIG. 9 that includes, among other things, processors 910, memory/storage 930, and I/O components 950. A representative hardware layer 804 is illustrated in FIG. 8 and can represent, for example, the machine 900 of FIG. 9. The representative hardware layer 804 comprises one or more processing units 806 having associated executable instructions 808. The executable instructions 808 represent the executable instructions of the software architecture 802, including implementation of the methods, modules, and so forth of FIGS. 4-7. The hardware layer 804 also includes memory and/or storage modules 810, which also have the executable instructions 808. The hardware layer 804 may also comprise other hardware 812, which represents any other hardware of the hardware layer 804, such as the other hardware illustrated as part of the machine 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and a presentation layer 844. Operationally, the applications 820 and/or other components within the layers may invoke application programming interface (API) calls 824 through the software stack and receive a response, returned values, and so forth, illustrated as messages 826, in response to the API calls 824. The layers illustrated are representative in nature and not all software architectures have all layers. For example, some mobile or special purpose operating systems may not provide a frameworks/middleware 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be utilized by the applications 820 or other components or layers. The libraries 816 typically provide functionality that allows other software modules to perform tasks in an easier fashion than to interface directly with the underlying operating system 814 functionality (e.g., kernel 828, services 830, and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware 818 may provide a higher-level common infrastructure that may be utilized by the applications 820 or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 820 or other software components/modules, some of which may be specific to a particular operating system or platform.

The applications 820 include built-in applications 840 or third party applications 842. Examples of representative built-in applications 840 may include, but are not limited to, a contacts application, a browser application, a book reader application, a location application, a media application, a messaging application, or a game application. The third party applications 842 may include any of the built in applications 840 as well as a broad assortment of other applications. In a specific example, the third party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 842 may invoke the API calls 824 provided by the mobile operating system such as the operating system 814 to facilitate functionality described herein.

The applications 820 may utilize built-in operating system functions (e.g., kernel 828, services 830, and/or drivers 832), libraries (e.g., system libraries 834, API libraries 836, and other libraries 838), and frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with a user.

Some software architectures utilize virtual machines. In the example of FIG. 8, this is illustrated by a virtual machine 848. A virtual machine creates a software environment where applications/modules can execute as if they were executing on a hardware machine (e.g., the machine of FIG. 9). A virtual machine is hosted by a host operating system (e.g., operating system 814) and typically, although not always, has a virtual machine monitor 846, which manages the operation of the virtual machine 848 as well as the interface with the host operating system (e.g., operating system 814). A software architecture executes within the virtual machine 848 such as an operating system 850, libraries 852, frameworks 854, applications 856, or presentation layer 858. These layers of software architecture executing within the virtual machine 848 can be the same as corresponding layers previously described or may be different.

Example Machine Architecture and Machine-Readable Medium

Figure 9:
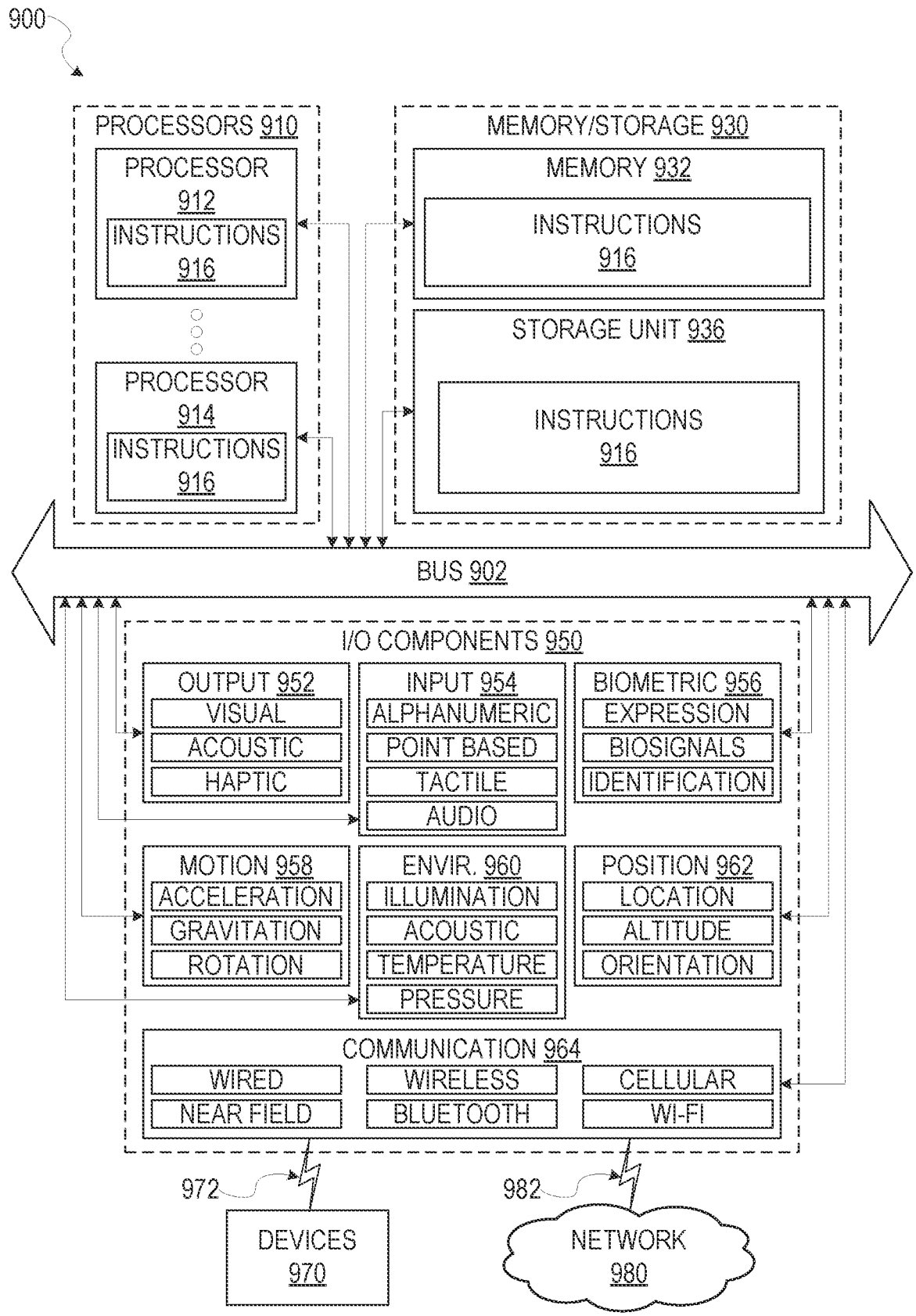
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the flow diagrams of FIGS. 6-7. The instructions 916 transform the general, non-programmed machine 900 into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 912 and a processor 914 that may execute the instructions 916. The term "processor" is intended to include a multi-core processor that may comprise two or more independent processors (sometimes referred to as "cores") that may execute the instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and the memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of the processors 910 are examples of machine-readable media.

As used herein, "machine-readable medium" means a device able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972 respectively. For example, the communication components 964 may include a network interface component or other suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   one or more processors;
   memory; and
   one or more programs stored in the memory, the one or more programs comprising instructions that when executed by the one or more processors, cause the one or more processors to perform operations comprising:
  selecting one or more predetermined user feedback questions based on a determination of relative impact each predetermined user feedback question has on future user purchase decisions by analyzing purchase trends for a product or type of product to determine which predetermined user feedback questions were most predictive of user purchase decisions;
  generating a user feedback page comprising a graphical feedback element associated with a user feedback question from the one or more predetermined user feedback questions and a first user feedback graphic, the graphical feedback element comprising a first graphic indicator and a second graphic indicator that each represents an answer to the user feedback question, the first user feedback graphic comprising an annulus that graphically displays a percentage corresponding to previous answers to the user feedback question by filling in a portion of the annulus based on the percentage;
  causing presentation of the generated user feedback page on a user interface of a client device of a user;
  receiving, via the user interface, an indication of a selection of the first graphic indicator or the second graphic indicator;
  in response to receiving the indication, generating a second user feedback graphic that includes feedback data from the user based on the selection of the first graphic indicator or the second graphic indicator; and
  causing an update to the user interface that replaces the first user feedback graphic with the second user feedback graphic and visually distinguishes the selected first graphic indicator or the second graphic indicator.

2. The system of claim 1, wherein the first user feedback graphic includes the percentage in a text format within the annulus.

3. The system of claim 1, wherein the selecting further comprises selecting the one or more predetermined user feedback questions from a plurality of predetermined user feedback questions ranked by topic based on the preferences of the user.

4. The system of claim 1, wherein the selecting further comprises selecting the one or more predetermined user feedback questions based on whether the one or more predetermined user feedback questions has reached a consensus.

5. The system of claim 1, wherein the operations further comprise:
  determining there are no predetermined user feedback questions associated with the product; and
  in response to determining that there are no predetermined user feedback questions already associated with the product, identifying a class of products associated with the product, wherein selecting the one or more predetermined user feedback questions for the product is based on predetermined questions associated with the class of products stored in a database associated with the system.

6. The system of claim 1, wherein the operations further comprise:
  receiving a purchase request for a product from a current user, wherein generating the user feedback page is in response to receiving the purchase request.

7. The system of claim 1, wherein generating the user feedback page comprises generating a set of aspect cards, each aspect card comprising a corresponding graphical feedback element associated with a different user feedback question and a corresponding user feedback graphic illustrating percentages corresponding to previous answers to the different user feedback question.

8. A method comprising:
  selecting one or more predetermined user feedback questions based on a determination of relative impact each predetermined user feedback question has on future user purchase decisions by analyzing purchase trends for a product or type of product to determine which predetermined user feedback questions were most predictive of user purchase decisions;
  generating a user feedback page comprising a graphical feedback element associated with a user feedback question from the one or more predetermined user feedback questions and a first user feedback graphic, the graphical feedback element comprising a first graphic indicator and a second graphic indicator that each represents an answer to the user feedback question, the first user feedback graphic comprising an annulus that graphically displays a percentage corresponding to previous answers to the user feedback question by filling in a portion of the annulus based on the percentage;
  causing presentation of the generated user feedback page on a user interface of a client device of a user;
  receiving, via the user interface, an indication of a selection of the first graphic indicator or the second graphic indicator;
  in response to receiving the indication, generating a second user feedback graphic that includes feedback data from the user based on the selection of the first graphic indicator or the second graphic indicator; and
  causing an update to the user interface that replaces the first user feedback graphic with the second user feedback graphic and visually distinguishes the selected first graphic indicator or the second graphic indicator.

9. The method of claim 8, wherein the first user feedback graphic includes the percentage in a text format within the annulus.

10. The method of claim 8, wherein the selecting further comprises selecting the one or more predetermined user feedback questions from a plurality of predetermined user feedback questions ranked by topic based on the preferences of the user.

11. The method of claim 8, wherein the selecting further comprises selecting the one or more predetermined user feedback questions with a fewest received responses.

12. The method of claim 8, further comprising:
  determining there are no predetermined user feedback questions associated with the product; and
  in response to determining that there are no predetermined user feedback questions already associated with the product, identifying a class of products associated with the product, wherein selecting the one or more predetermined user feedback questions for the product is based on predetermined questions associated with the class of products stored in a database associated with the system.

13. The method of claim 8, further comprising:
  receiving a purchase request for a product from a current user, wherein generating the user feedback page is in response to receiving the purchase request.

14. The method of claim 8, wherein generating the user feedback page comprises generating a set of aspect cards, each aspect card comprising a corresponding graphical feedback element associated with a different user feedback question and a corresponding user feedback graphic illustrating percentages corresponding to previous answers to the different user feedback question.

15. A non-transitory computer-readable storage medium storing instructions that, when executed by one or more processors of a machine, cause the machine to perform operations comprising:
    selecting one or more predetermined user feedback questions based on a determination of relative impact each predetermined user feedback question has on future user purchase decisions by analyzing purchase trends for a product or type of product to determine which predetermined user feedback questions were most predictive of user purchase decisions;
    generating a user feedback page comprising a graphical feedback element associated with a user feedback question from the one or more predetermined user feedback questions and a first user feedback graphic, the graphical feedback element comprising a first graphic indicator and a second graphic indicator that each represents an answer to the user feedback question, the first user feedback graphic comprising an annulus that graphically displays a percentage corresponding to previous answers to the user feedback question by filling in a portion of the annulus based on the percentage;
    causing presentation of the generated user feedback page on a user interface of a client device of a user;
    receiving, via the user interface, an indication of a selection of the first graphic indicator or the second graphic indicator;
    in response to receiving the indication, generating a second user feedback graphic that includes feedback data from the user based on the selection of the first graphic indicator or the second graphic indicator; and
    causing an update to the user interface that replaces the first user feedback graphic with the second user feedback graphic and visually distinguishes the selected first graphic indicator or the second graphic indicator.

16. The non-transitory computer-readable storage of claim 15, wherein the user feedback graphic includes the percentage in a text format within the annulus.

17. The non-transitory computer-readable storage of claim 15, wherein the selecting further comprises selecting the one or more predetermined user feedback questions from a plurality of predetermined user feedback questions ranked by topic based on the preferences of the user.

18. The non-transitory computer-readable storage of claim 15, wherein the operations further comprise:
    selecting the one or more predetermined user feedback questions based on whether the one or more predetermined user feedback questions has reached a consensus.

19. The non-transitory computer-readable storage of claim 15, wherein the operations further comprise:
    determining there are no predetermined user feedback questions associated with the product; and
    in response to determining that there are no predetermined user feedback questions already associated with the product, identifying a class of products associated with the product, wherein selecting the one or more predetermined user feedback questions for the product is based on predetermined questions associated with the class of products stored in a database associated with the system.

20. The non-transitory computer-readable storage of claim 15, wherein the operations further comprise:
    receiving a purchase request for a product from a current user, wherein generating the user feedback page is in response to receiving the purchase request.

* * * * *